US010534854B2

(12) United States Patent
Sharma et al.

(10) Patent No.: US 10,534,854 B2
(45) Date of Patent: *Jan. 14, 2020

(54) GENERATING A TARGETED SUMMARY OF TEXTUAL CONTENT TUNED TO A TARGET AUDIENCE VOCABULARY

(71) Applicant: Adobe Inc., San Jose, CA (US)

(72) Inventors: Saumitra Sharma, Gwalior (IN); Kundan Krishna, Bangalore (IN); Balaji Vasan Srinivasan, Bangalore (IN); Aniket Murhekar, Chennai (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,596

(22) Filed: May 9, 2019

(65) Prior Publication Data

US 2019/0266228 A1    Aug. 29, 2019

Related U.S. Application Data

(63) Continuation of application No. 15/816,976, filed on Nov. 17, 2017, now Pat. No. 10,409,898.

(51) Int. Cl.
*G06F 17/22* (2006.01)
*G06F 17/27* (2006.01)
*G06N 20/00* (2019.01)

(52) U.S. Cl.
CPC ...... *G06F 17/2264* (2013.01); *G06F 17/2785* (2013.01); *G06F 17/2795* (2013.01); *G06N 20/00* (2019.01)

(58) Field of Classification Search
CPC ............ G06F 17/2264; G06F 17/2785; G06F 17/2795; G06N 20/00; G10L 21/0205; G10L 21/0232; G10L 25/18; G10L 25/21
See application file for complete search history.

(56) References Cited

U.S. PATENT DOCUMENTS 6,745,161 B1 *  6/2004  Arnold ................ G06F 16/3338
                                                    704/7
9,940,933 B2    4/2018  Choi et al.
(Continued)

OTHER PUBLICATIONS

Automatic Indexing of Abstracts via Natural• Ianuuaue Processing Using aSimple Thesaurus David A. Evans, PhD, William R. Hersh, MD, Ira A. Monarch, Robert G. Lefferts, Steven K. Handerson, 1991 (Year: 1991).*

(Continued)

*Primary Examiner* — Mohammad K Islam
(74) *Attorney, Agent, or Firm* — SBMC

(57) ABSTRACT

A targeted summary of textual content tuned to a target audience vocabulary is generated in a digital medium environment. A word generation model obtains textual content, and generates a targeted summary of the textual content. During the generation of the targeted summary, the words of the targeted summary generated by the word generation model are tuned to the target audience vocabulary using a linguistic preference model. The linguistic preference model is trained, using machine learning on target audience training data corresponding to a corpus of text of the target audience vocabulary, to learn word preferences of the target audience vocabulary between similar words (e.g., synonyms). After each word is generated using the word generation model and the linguistic preference model, feedback regarding the generated word is provided back to the word generation model. The feedback is utilized by the word generation model to generate subsequent words of the summary.

20 Claims, 10 Drawing Sheets

(56) References Cited

U.S. PATENT DOCUMENTS

| | | | |
|---|---|---|---|
| 10,409,898 B2 | 9/2019 | Sharma et al. | |
| 2008/0109425 A1* | 5/2008 | Yih | G06F 16/345 |
| 2016/0140643 A1* | 5/2016 | Nice | G06F 16/313 |
| | | | 705/26.7 |
| 2017/0147544 A1* | 5/2017 | Modani | G06F 17/24 |
| 2018/0232342 A1* | 8/2018 | Tong | G06F 17/2881 |
| 2018/0232443 A1* | 8/2018 | Delgo | G06F 17/278 |
| 2018/0285339 A1* | 10/2018 | Bostick | G06F 17/277 |
| 2018/0300400 A1* | 10/2018 | Paulus | G06F 17/289 |
| 2018/0365579 A1* | 12/2018 | Wan | G06N 5/046 |
| 2019/0155877 A1 | 5/2019 | Sharma et al. | |

OTHER PUBLICATIONS

ParaEval: Using Paraphrases to Evaluate Summaries Automatically Liang Zhou, Chin-Yew Lin, Dragos Stefan Munteanu, and Eduard Hovy, 2006 (Year: 2006).*

Automated Text Summarization in SUMMARIST Eduard Hovy and Chin-Yew Lin, 1999 (Year: 1999).*

"Combined Search and Examination Report", GB Application No. 1814861.9, dated Feb. 27, 2019, 6 pages.

"Notice of Allowance", U.S. Appl. No. 15/816,976, dated Apr. 29, 2019, 18 pages.

"Pre-Interview First Office Action", U.S. Appl. No. 15/816,976, dated Apr. 4, 2019, 3 pages.

Biran,"Putting it Simply: A Context-Aware Approach to Lexical Simplification", in Proceedings of the 49th Annual Meeting of the Association for Computational Linguistics: Human Language Technologies, Jun. 19, 2011, 6 pages.

Burns,"MorphAdorner v2: A Java Library for the Morphological", Oct. 1, 2013, 365 pages.

Evans,"Automatic Indexing of Abstracts via Natural-language Processing Using a Simple Thesaurus", Dec. 1991, pp. S108-S115.

Hermann,"Teaching Machines to Read and Comprehend", In Journal of Computing Research Repository, Jun. 2015, 14 pages.

Heuven,"SUBTLEX-UK: A new and improved word frequency database for British English", in Quarterly Journal of Experimental Psychology, 2014, Jan. 13, 2014, 15 pages.

Hochreiter,"Long Short-Term Memory", In Neural computation, 1997, Nov. 15, 1997, 32 pages.

Hovy,"Automated Text Summarization in SUMMARIST", Advances in automatic text summarization, 1999, Jun. 1999, 14 pages.

Kincaid,"Derivation of New Readability Formulas (Automated Readability Index, Fog Count and Flesch Reading Ease Formula) for Navy Enlisted Personnel", Jan. 1, 1975, 49 pages.

Lin,"Automatic Evaluation of Machine Translation Quality Using Longest Common Subsequence and Skip-Bigram Statistics", In Proceedings of the 42nd Annual Meeting of the Association for Computational Linguistics, Jul. 21, 2004, 8 pages.

Nallapati,"Abstractive Text Summarization using Sequence-to-sequence RNNs and Beyond", in 20th SIGNLL Conference on Computational Natural Language Learning (CoNLL), 2016, Aug. 26, 2016, 12 pages.

Paetzold,"LEXenstein: A Framework for Lexical Simplification", Jul. 26, 2015, 6 pages.

Paetzold,"Unsupervised Lexical Simplification for Non-Native Speakers", Proceedings of the Thirtieth AAAI Conference on Artificial Intelligence (AAAI-16), Mar. 5, 2016, 7 pages.

See,"Get to the Point: Summarization with Pointer-Generator Networks", Apr. 25, 2017, 20 pages.

Sutskever,"Sequence to Sequence Learning with Neural Networks", in Advances in neural information processing systems, 2014., Dec. 14, 2014, 9 pages.

Zhou,"ParaEval: Using Paraphrases to Evaluate Summaries Automatically", Jun. 2006, pp. 447-454.

"Corrected Notice of Allowability", U.S. Appl. No. 15/816,976, dated Aug. 14, 2019, 2 pages.

* cited by examiner

500

| Input Article 502 | French striker Bafetimbi Gomis, who has a history of fainting, said he is now "feeling well" after collapsing during Swansea's 3-2 loss at Tottenham in the Premier League on Wednesday. The worrying incident occurred in the first half at White Hart Lane -- after Tottenham scored in the seventh minute -- but the 29-year-old left the pitch conscious following about five minutes of treatment. The Guardian added that he was wearing an oxygen mask. Play was temporarily stopped before resuming. .... |
| --- | --- |
| Human-Generated Summary 504 | "Bafetimbi Gomis collapses within 10 minutes of kickoff at Tottenham |
| Pointer Generation Model Summary 506 | French striker Bafetimbi Gomis, who has a history of fainting, said he is now "feeling well" after collapsing during Swansea's 3-2 loss at Tottenham in the premier league on Wednesday |
| Summary with Post Processing 508 | French hitter Bafetimbi Gomis, who has a story of faint, tell he is now "look good" after ... |
| Statistically Replaced Generation 510 | French striker Bafetimbi Gomis, who has a history of fainting, is now fine. |
| Probabilistically Re-Weighted Generation 512 | French striker Bafetimbi Gomis, who has a history of fainting, ... said he was fine after collapsing ... |

*Fig. 5*

900

902
Receive a request to generate a targeted summary of textual content tuned to a target audience vocabulary

904
Generate, by a word generation model, an attention distribution which includes words from the textual content and the target audience vocabulary and selection probability values for each word in the attention distribution, where the selection probability values indicate a respective probability for each word of being selected as the next word for the targeted summary of the textual content

906
Select the next word for the targeted summary based on the attention distribution and a linguistic preference model indicating word preference probabilities for the target audience vocabulary

908
Provide feedback of the selected word to the word generation model, the feedback causing the word generation model to modify the attention distribution for selection of subsequent words of the targeted summary based on the feedback of the next selected word

GENERATING A TARGETED SUMMARY OF TEXTUAL CONTENT TUNED TO A TARGET AUDIENCE VOCABULARY

CLAIM OF PRIORITY

This application is a continuation of and claims priority to U.S. patent application Ser. No. 15/816,976 filed Nov. 17, 2017, entitled "Generating a Targeted Summary of Textual Content Tuned to a Target Audience Vocabulary", the entire disclosure of which is hereby incorporated by reference herein in its entirety.

BACKGROUND

Automatic Summarization of textual content can be used to save time for end users by providing an overview of textual content (e.g., a document or an article) which can be quickly read by the user. Conventional extractive summarization techniques extract out key phrases from the input textual content, and then select a subset of these phrases to place in the summary. Summaries generated by these conventional summarization techniques, however, are often not human like. Furthermore, some conventional summarization techniques generate a summary, and then can "tune" the summary to a target audience as a post processing step after generation of the summary. However, tuning a summary to a target audience after the summary is generated often results in changing the meaning of the original text. Consider, for example, the sentence "the entire journey is bigger than the team". Based on a linguistic preference of a target audience, the word "total" may be preferred over word "entire", and the word "travel" may be preferred over the word "journey". While both of these words are fine replacements for the original word, a resulting sentence formed by replacing these words, e.g., "the total travel is bigger than the team", does not have the same meaning as the original sentence. Furthermore, existing summarization techniques are unable to generate multiple summaries which are tuned to different target audience vocabularies.

SUMMARY

To overcome these problems, a targeted summary of textual content tuned to a target audience vocabulary is generated in a digital medium environment. A word generation model obtains textual content, and generates a targeted summary of the textual content. During the generation of the targeted summary, the words of the targeted summary generated by the word generation model are tuned to the target audience vocabulary using a linguistic preference model. The linguistic preference model is trained, using machine learning on target audience training data corresponding to a corpus of text of the target audience vocabulary, to learn word preferences of the target audience vocabulary between similar words (e.g., synonyms). After each word is generated using the word generation model and the linguistic preference model, feedback regarding the generated word is provided back to the word generation model. The feedback is utilized by the word generation model to generate subsequent words of the summary such that the context of the textual document and the already generated words of the summary is maintained.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 5 illustrates an example of various summaries of an input article which are generated using different summarization techniques.

FIG. 9 depicts an additional example procedure of generating a targeted summary of textual content tuned to a target audience vocabulary.

DETAILED DESCRIPTION

Overview

Figure 1:
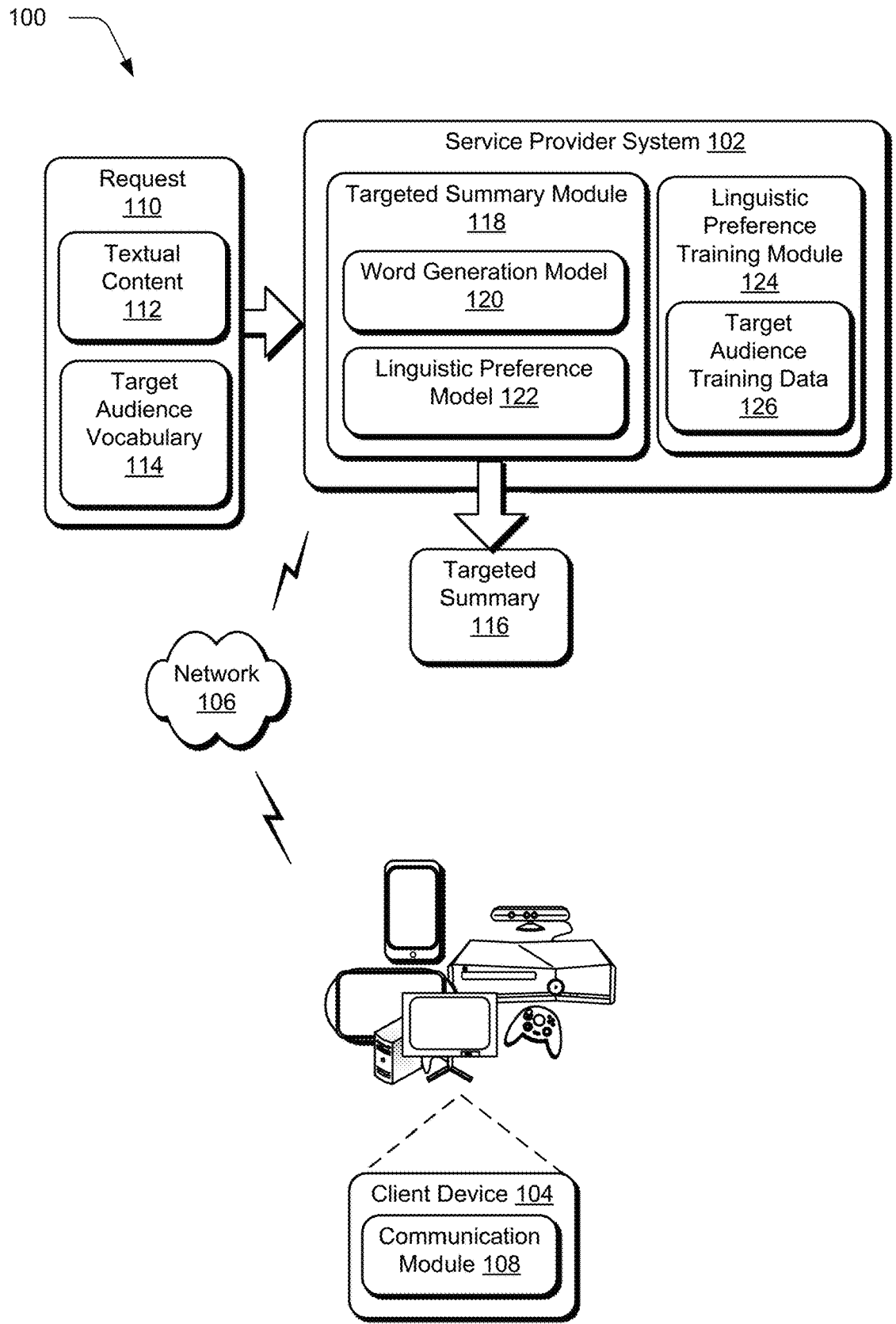
FIG. 1 is an illustration of a digital medium environment in an example implementation that is operable to employ generating a targeted summary tuned to a target audience vocabulary techniques described herein.

Techniques for generating a targeted summary of textual content tuned to a target audience vocabulary in a digital medium environment are described herein. A word generation model is utilized with a linguistic preference model associated with a target audience vocabulary to generate a summary of textual content tuned to target audience vocabulary. The word generation model may correspond to a machine-learning or rule-based summarization model which utilizes extractive and/or abstractive summarization techniques to generate summaries of textual content. The linguistic preference model is trained using machine learning techniques on training data of the target audience vocabulary to learn word preferences of the target audience vocabulary between similar words (e.g., synonyms). Notably, a single word generation model can be utilized to generate multiple summaries tuned to different audience vocabularies by utilizing different linguistic preference models without the need to explicitly re-train the word generation model for each different target audience vocabulary. A target audience vocabulary, as described herein, may be based on a type of words (e.g., simple or complex) or a demographic of people (e.g., college educated, living in the UK, income level, age, or sex).

To generate a targeted summary, the word generation model obtains textual content, and generates a summary of the textual content using one or more summarization techniques. Unlike existing techniques which account for a target audience's linguistic preference as a post processing step, the described techniques tune the words generated by the word generation model to the target audience vocabulary using the linguistic preference model during the generation of the summary. After each word is generated using the word generation model and the linguistic preference model, feedback regarding the generated word is provided back to the word generation model. The feedback is usable by the word generation model to adjust subsequent generation of word of the summary. Notably, since the tuning to the target audience vocabulary occurs during generation of the summary, the summary is generated based on both the input text and the words of the already generated words of the summary. As such, summaries generated using the described techniques generate summaries of textual content tuned to a target audience vocabulary which are more readable than summaries generated with post processing tuning to the target audience. Furthermore, the summaries of the described techniques are better tuned to target audience than even human-generated summaries which are generated without the machine-trained knowledge of the target audience vocabulary.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ generating a targeted summary tuned to a target audience vocabulary techniques described herein. The illustrated environment 100 includes a service provider system 102 and a client device 104 that are communicatively coupled via a network 106. Computing devices that implement the service provider system 102 and the client device 104 may be configured in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as described in FIG. 10.

The client device 104 is illustrated as including a communication module 108 that is representative of functionality to communicate via the network 106, e.g., with the service provider system 102 using a browser, network-enabled application, operating system, and so forth. The communication module 108, for instance, may form a request 110 for a summary of textual content 112 tuned to a target audience 114. As described herein, textual content 112 may include any type of textual content, such as articles, word processing documents, text on a web page, PDFs, and so forth. A target audience vocabulary 114, as described herein, may be based on a type of words (e.g., simple, complex) or a demographic of people (e.g., college educated, living in the UK, income level, age, sex, and so forth). The request 110 can be communicated to the service provider system 102 via network 106. In response to request 110, service provider system 102 generates and returns a targeted summary 116 of the inputted textual content 112 tuned to the target audience vocabulary 114. A targeted summary 116, as described herein, corresponds to a short succinct version of the input textual content 112 accounting for the vocabulary of a target audience. Although illustrated as being implemented remote from client devices 104, functionality of the illustrated service provider system 102 may also be implemented in whole or part locally at the client devices 104. For example, the targeted summary module 118 can be implemented to generate a targeted summary 116 locally at the client device 104 from which request 110 is received.

In order to generate the targeted summary 116, the service provider system 102 employs a targeted summary module 118 configured to generate the targeted summary 116 which is tuned to the requested target audience vocabulary 114. The targeted summary module 118 utilizes both a word generation model 120 configured to generate a summary of textual content, and a linguistic preference model 122 trained to capture word preferences of the target audience vocabulary 114. The word generation model 120 may correspond to any type of word generation model or algorithm that can generate summaries of textual content. In some cases, the word generation model 120 is trained using machine learning (e.g., a neural network) to generate summaries of textual content. For example, the word generation model 120 may be implemented as an extractive summarization algorithm, an abstractive summarization algorithm, a sequence to sequence neural encoder, and so forth.

Service provider system is further illustrated as including a linguistic preference training module 124 ("training module 124") which trains the linguistic preference model 122 to learn word preferences of various target audience vocabularies 114. The training module 124 trains the linguistic preference model 122 using machine learning applied to target audience training data 126 ("training data 126). The training data 126 corresponds to a corpus of textual content generated with the target audience vocabulary 114. The training module 124, generally, trains the linguistic preference model 122 based on the insight that amongst different words which mean the same thing (e.g., synonyms), the ones which are used more often are more preferred. Hence, the linguistic preference model 122 learns word preferences which may be defined in a relative scenario in terms of target audience preferences between a word $w_1$ and its synonym $w_2$. Starting with the training data 126 for a particular target audience vocabulary 114, the training module 124 builds a probabilistic mapping $P_{pref}(w_1|w_2)$ indicating the probability of word $w_1$ being preferred over $w_2$ based on the frequency of the word usage in the training data 126 along with its usage context in the training data 126. A further discussion of training the linguistic preference model 122 is discussed below with regards to FIG. 2.

In one or more implementations, the word generation model 120 generates the words of the targeted summary 116 using a "word-by-word" summarization process. To generate each "next word" of the targeted summary 116, the word generation model 120 computes a probability distribution based on a combination of the input text of the textual content 112 and the text of the targeted summary that has already been generated. After each word of the targeted summary 116 is generated, the word generation model 120 receives feedback regarding the generated word. This feedback is used by the word generation model to generate the subsequent words of the targeted summary 116. Unlike existing word generation techniques, the word generation model 120 generates words for the targeted summary based on both the context of the input textual content 112 and the words of the summary that have been generated so far.

In order to cause the targeted summary 116 to be tuned to the linguistic preferences of the target audience vocabulary 114, the word-by-word generation process employed by the word generation model 120 is constrained by the learnt linguistic preferences of the linguistic preference model 122 during generation of the summary. This can be achieved by replacing the "lesser preferred" word with a "more preferred" alternative word with a similar meaning as the lesser preferred word. However, this may result in a total change in the meaning conveyed by the summary of the textual content. Therefore, the targeted summary module 118 can tune the targeted summary to the linguistic preference of the target audience by modifying the word generation probabilities in tune with the linguistic preference model 122. A further discussion of utilizing a word generation model 120 and a linguistic preference model 122 to generate a targeted summary tuned to the linguistic preferences of a target audience is discussed below with regards to FIG. 3.

The targeted summary module 118 may be implemented to provide targeted summaries for a variety of different use case. In some instances, the targeted summary module 118 can be utilized by the content author of the textual content 112 (e.g., a content author of an article, paper, or book), to quickly and automatically generate a summary of their textual content 112. The targeted summary module 118 enables the content author to tune the summary to the vocabulary of specific targeted audiences, which may enable authors to tune the summary to multiple different target audiences. For instance, a content author may want different summaries to be provided at different platforms based on different audiences which frequent such platforms. In other instances, the targeted summary module 118 may be utilized by customers or end consumers of textual content. In this context, the targeted summary module 118 may aid in providing a consumer-specific summary of a longer article or paper that can easily be consumed over mobile notifications or on a wearable device. In this instance, the targeted summary module 118 can be implemented to determine demographics information of the end user, and then tune the summary to a vocabulary corresponding to the user's demographic information.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Linguistic Preference Model Training

Linguistic preference model 122 can be trained using one or more machine learning techniques to learn word preference probabilities of the target audience vocabulary based on a frequency of word usage in the target audience vocabulary. To do so, linguistic preference training module 124 identifies a word in the target audience training data 126, and then identifies one or more synonyms of the word. Then, for each word-synonym pair, a word preference probability is generated, for each respective word-synonym pair, based on respective frequencies of the word and the synonym in the target audience vocabulary.

Figure 2:
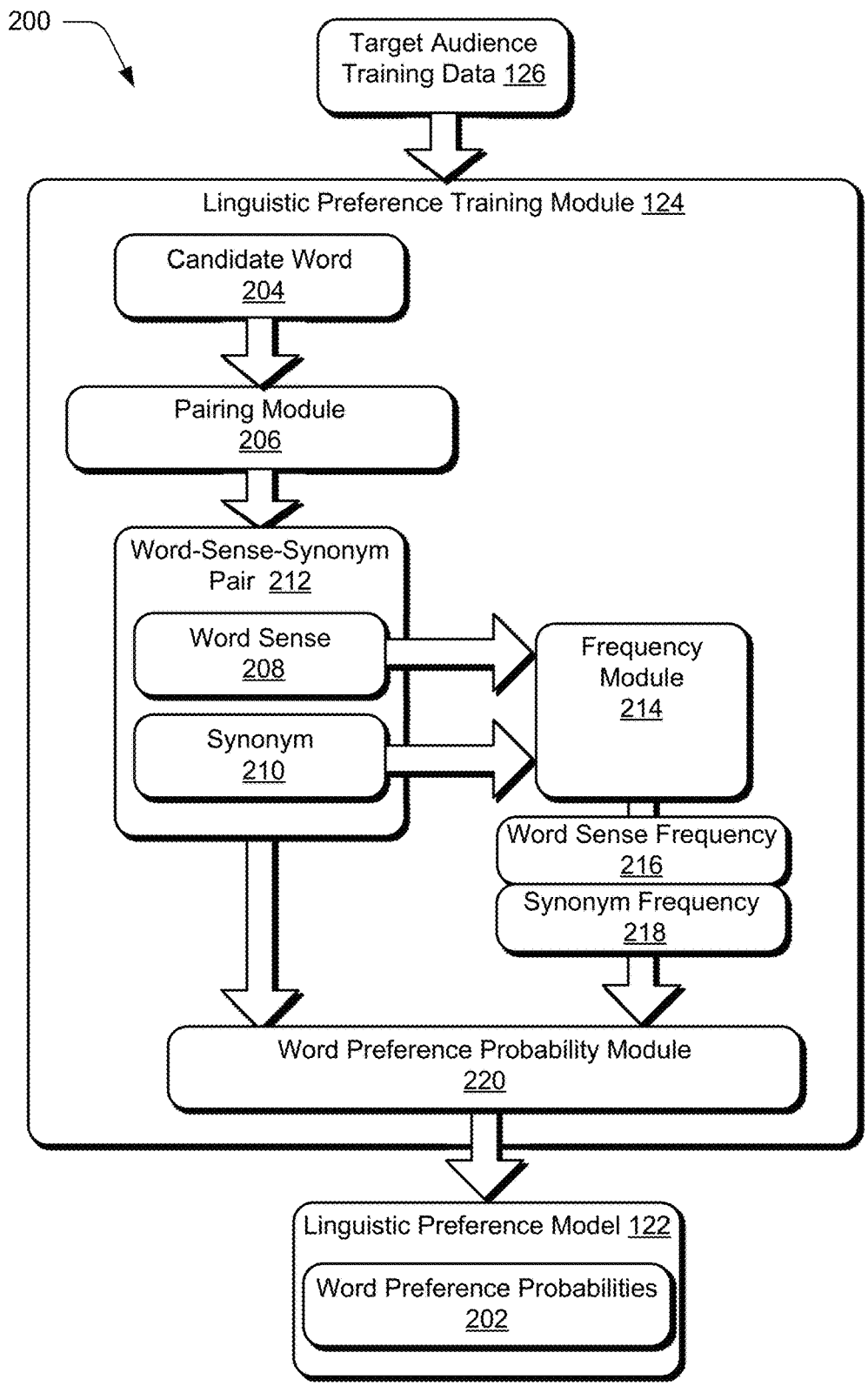
FIG. 2 depicts a system in an example implementation in which a linguistic preference model is trained using machine learning on target audience training data.

In more detail, consider FIG. 2 which depicts a system 200 in an example implementation in which a linguistic preference model is trained using machine learning on target audience training data.

In system 200, training module 124 obtains target audience training data 126, corresponding to a corpus of textual content for a respective target audience vocabulary 114. The training data 126, for instance, may include a multitude (e.g., ten thousand) pieces of textual content (e.g., articles, papers, books) which are generated using the intended target audience vocabulary 114. The training module 124 uses the training data 126 to learn word preference probabilities 202 for the linguistic preference model 122. The word preference probabilities 202 indicate relative preferences between words with similar meanings (e.g., synonyms) in the target audience vocabulary 114. The determination of the word preference probabilities 202 may be based on a frequency of word usage in the training data 126, such that a first word is preferred over a second word which is a synonym of the first word if the first word occurs more frequently in the training data 126. However, other metrics may also be used to determine the importance of similar words relative to each other without departing from the spirit or scope of the described techniques.

In system 200, in order to train the linguistic preference model 122, each candidate word 204 in the training data 126 is passed to a pairing module 206 employed by the linguistic preference training module 124. The pairing module 206 identifies all of the word senses 208 of the given candidate word 204 and all of the synonyms 210 of the various word senses 208 of the candidate word 204. In linguistics, a "word sense" is one of the meanings of a word. Some words have multiple meanings, while other words have only one meaning. For example, the word "play" may have over 50 different senses, each of which have a different meaning based on the context of the word's usage in a sentence. The pairing module 206 generates word sense-synonyms pairs 212 for each respective candidate word 204. In some cases, the word sense-synonym pairs 212 are morphed to a form suitable to replace the candidate word 204 based on a morphological analysis.

The word sense-synonym pairs 212 are then passed to a frequency module 214, of the training module 124. The frequency module 214 determines a word sense frequency 216 and a synonym frequency 218 for each word sense 208 and synonym 210, respectively, of the word sense-synonym pair 212. The frequencies 216 and 218 correspond to the number of occurrences of each word in the training data 126.

Next, a word preference probability module 220, of the training module 124, obtains the word sense frequency 216 and synonym frequency 218 for each respective word sense-synonym pair 212, and generates the word preference probability 202 for the respective word sense-synonym pair 212. The word preference probability for a given word-synonym pair indicates that the synonym is preferred over the word (or word sense of the word) if the frequency of the synonym is greater than the frequency of the word in the target audience training data.

In one or more implementations, the word preference probability 202 of a word ($w_i$) being preferred over a word ($w_j$) is determined by the word preference probability module 220 using the following algorithm:
$P_{pref}(w_i|w_j)$ is given by, $$P_{pref}(w_i \mid w_j) = \frac{f_{w_i}}{\sum_{w \in synset(w_j) \& f_w \geq f_{w_j}} f_w},$$

if $f_{w_i} \geq f_{w_j}$ and $w_i \in synset(w_j)$; 0 otherwise,

In this algorithm, $f_{wi}$ is the frequency, determined by the frequency module 214, of word $w_i$ in the training data 126. The condition $f_{wi} \geq f_{wi}$ ensures that the word $w_i$ which is a synonym of $w_j$, is used more frequently in the training data 126 and hence is more preferred. The summation in the denominator only contains words that have higher frequencies and hence are more preferred than $w_j$.

The learned word preference probabilities 202 of the linguistic preference model 122 for a given target audience vocabulary 114, once trained, may then be used by the targeted summary module 118 to tune the summary generated by the word generation model 120 to the target audience vocabulary, which is discussed in further detail below with regards to FIG. 3.

Generating a Targeted Summary Tuned to a Target Audience Vocabulary

Figure 3:
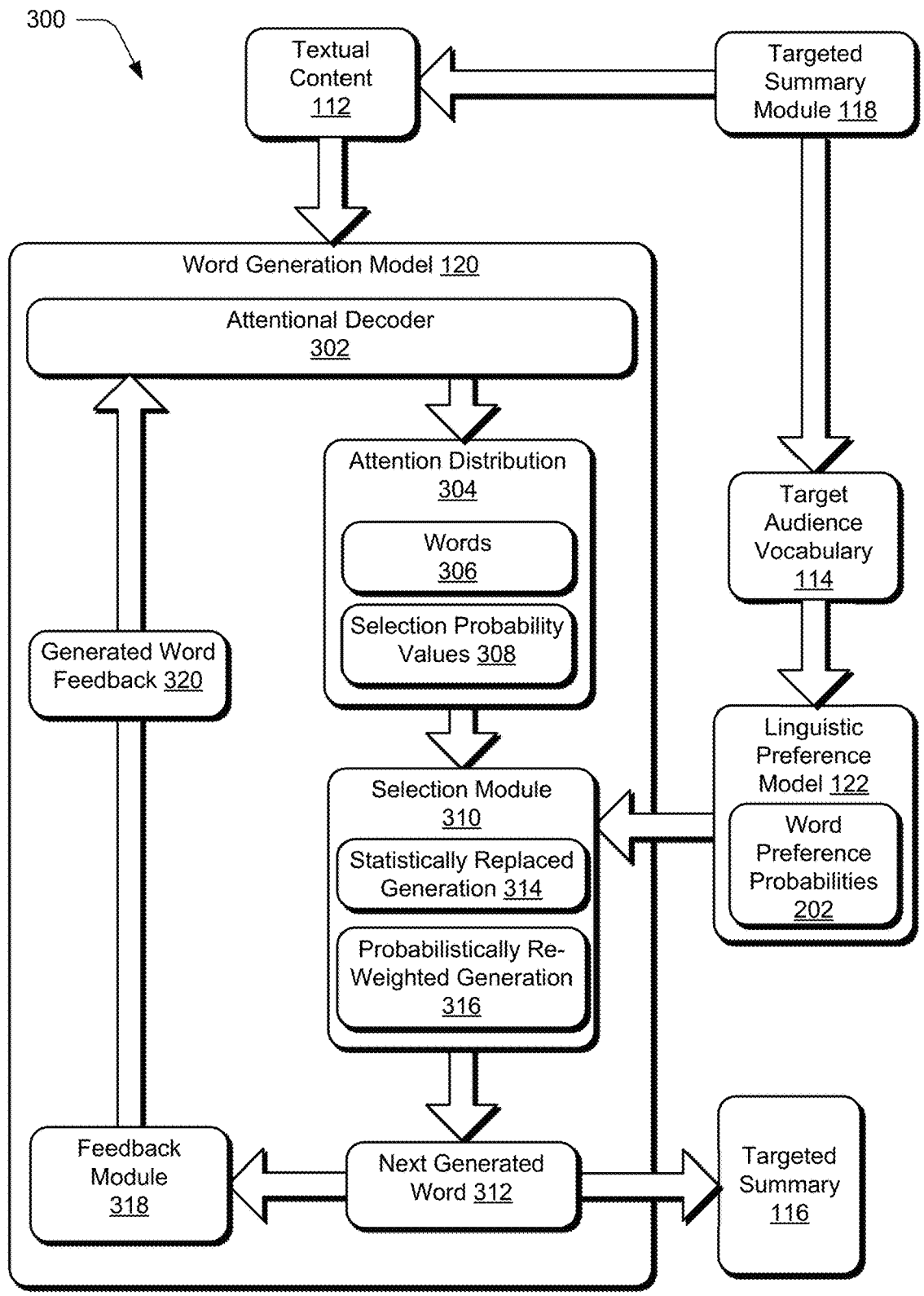
FIG. 3 depicts a system in an example implementation in which the word generation model of FIG. 1 generates a targeted summary of textual content tuned to a target audience vocabulary.

FIG. 3 depicts a system 300 in an example implementation in which the word generation model 120 of FIG. 1 generates a targeted summary 116 of textual content 112 tuned to a target audience vocabulary 114.

In system 300, targeted summary module 118 receives request 110 to generate a targeted summary of textual content 112 tuned to a target audience vocabulary 114. In some cases, the request can be received from a content author of the textual content 112, such as an author of an article, book, and so forth. Alternately, the request can be received from a consumer of the textual content 112 in order to generate a summary of the textual content.

The request 110 may include an indication of the target audience. For example, the content author of textual content can submit the request via a user interface which enables the content author to select a target audience vocabulary for the summary. In this way, the content author can select a target audience, which for example, may correspond to an intended audience of the content. Notably, the content author is able to generate multiple different summaries using the techniques described herein, such that different summaries can be generated for different target audiences. Alternately, the target audience can be automatically determined by the targeted summary module 118. For example, the target audience may be determined based on demographic information associated with an end consumer who requests the summary.

Targeted summary module 118 provides the textual content 112 to the word generation model 120, and provides the requested target audience vocabulary to the linguistic preference model 122. In system 300, an attentional decoder 302 of the word generation model 120 receives as input the textual content 112, and generates an attention distribution 304 of words 306 in the textual content 112. The attention distribution 304 indicates, for each word 306, a selection probability value 308. The selection probability value 308 indicates a probability of the corresponding word 306 being selected as a next generated word for the targeted summary 116. The attentional decoder 302 determines the selection probability value 308 based on the words in the inputted textual content 112 as well the words of the targeted summary 116 which have already been generated by the word generation model 120.

The word generation model 120 is further illustrated as including a selection module 310 which is configured to select a next generated word 312 for the targeted summary 116 based on the attention distribution 304, generated by the attentional decoder 302 of the word generation model 120, and the linguistic preference model 122 trained on training data 126 corresponding to the target audience vocabulary 114, as described with reference to FIG. 2 above.

To encourage generation of the most preferred words of the target audience vocabulary 114, the selection module 310 modifies the selection probability values 308 of the attention distribution 304 with the word preference probabilities 202 of the target audience learned by the linguistic preference model 122. Thus, the selection module 310 selects the next generated word 312 by either selecting a word from the input textual content 112 based on the attention distribution 304, or by replacing a word from the input textual content 112 with a more preferred synonym of the target audience, as indicated by the word preference probabilities 202 of the linguistic preference model 122. The selection module 310 may select the next generated word 312 of the targeted summary 116 using a variety of different word generation techniques. In this example, the selection module 310 can select the next generated word 312 using either statistically replaced generation 314 or probabilistically re-weighted generation 316.

In statistically replaced generation techniques, a word generated by the word generation model is replaced with a more preferred synonym as defined by the linguistic preference model 122. To do so, the selection probability values 308 in the attention distribution 304 are boosted for the words that are preferred by the target audience. Doing so ensures that the most preferred word is used for the current context and is utilized in subsequent generation. Since the word generation model 120 uses this information for subsequent word generation, the word generation model 120 is able to generate complete sentences which make sense even after words from the textual content are replaced with more preferred words identified by the linguistic preferences model. Notably, this is often not the case when a complete summary is generated first, and then words of the generated summary are then naively replaced with the most preferred synonym after generating the entire summary.

To select the next generated word 312 using statistically replaced generation 314, the selection module replaces the words 306 in the attention distribution 304 with more preferred similar words, as determined by the linguistic preference model 122. In some cases, this means that words in the attention distribution are replaced with their most preferred synonym. In one or more implementations, the selection module 310 uses the following algorithm for statistically replaced generation:

$$\operatorname*{argmax}_{w_i} \left( P(w_i) \sum_W P_{pref}(w_i \mid w) \right)$$

In the algorithm above P(w) corresponds to selection probability 308 of a given word generated by the attentional decoder 302, and $P_{pref}(w_i|w_k)$ corresponds to the word preference probability 202 for the word learned by the linguistic preference model 122. The term $$\sum_{W} P_{pref}(w_i | w) P(w)$$

yields a "preference score" to the word $w_i$ based on its preference probability over the entire target audience vocabulary 114. By weighting the resulting score with the generation probability, this approach identifies a combination of the most preferred word with the best possible generation probability.

While statistically replaced generation 314 identifies the most preferred word substitute during word generation, it does not account for the most preferred word across the candidates for generation. To achieve this, the next generated word 312 can be selected by the selection module 310 using probabilistically re-weighted generation 316. In probabilistically re-weighted generation 316, the probability of a word being chosen depends on how likely it is to replace a lesser preferred synonym, weighted by how likely it was for the lesser preferred synonym to be generated in the first place. In order to generated the next word 31 using probabilistically re-weighted generation 316, the following algorithm can be used:

$$\underset{w_i}{\operatorname{argmax}} \left( P(w_i) \sum_{W} P_{pref}(w_i | w) P(w) \right)$$

Note that the preference score in this case is obtained by weighting the probability of the generation of the words that the current candidate word is preferred over. Thus, probabilistically re-weighted generation 316 chooses the candidate word that is most preferred over the entire candidates for generation and weights them with the respective generation probability to simultaneously choose the most preferred word that is also most likely to be generated in the context of the given input.

After the next generated word 312 is selected by the selection module 310, the generated word is added to the targeted summary 116. In addition, a feedback module 318 provides generated word feedback 320 to the attentional decoder 302, which is usable by the attentional decoder 302 to select the subsequent words for the targeted summary 116, thereby maintaining the coherence in the word generation of the targeted summary 116.

Word Generation Model Via a Neural Encoder

Figure 4:
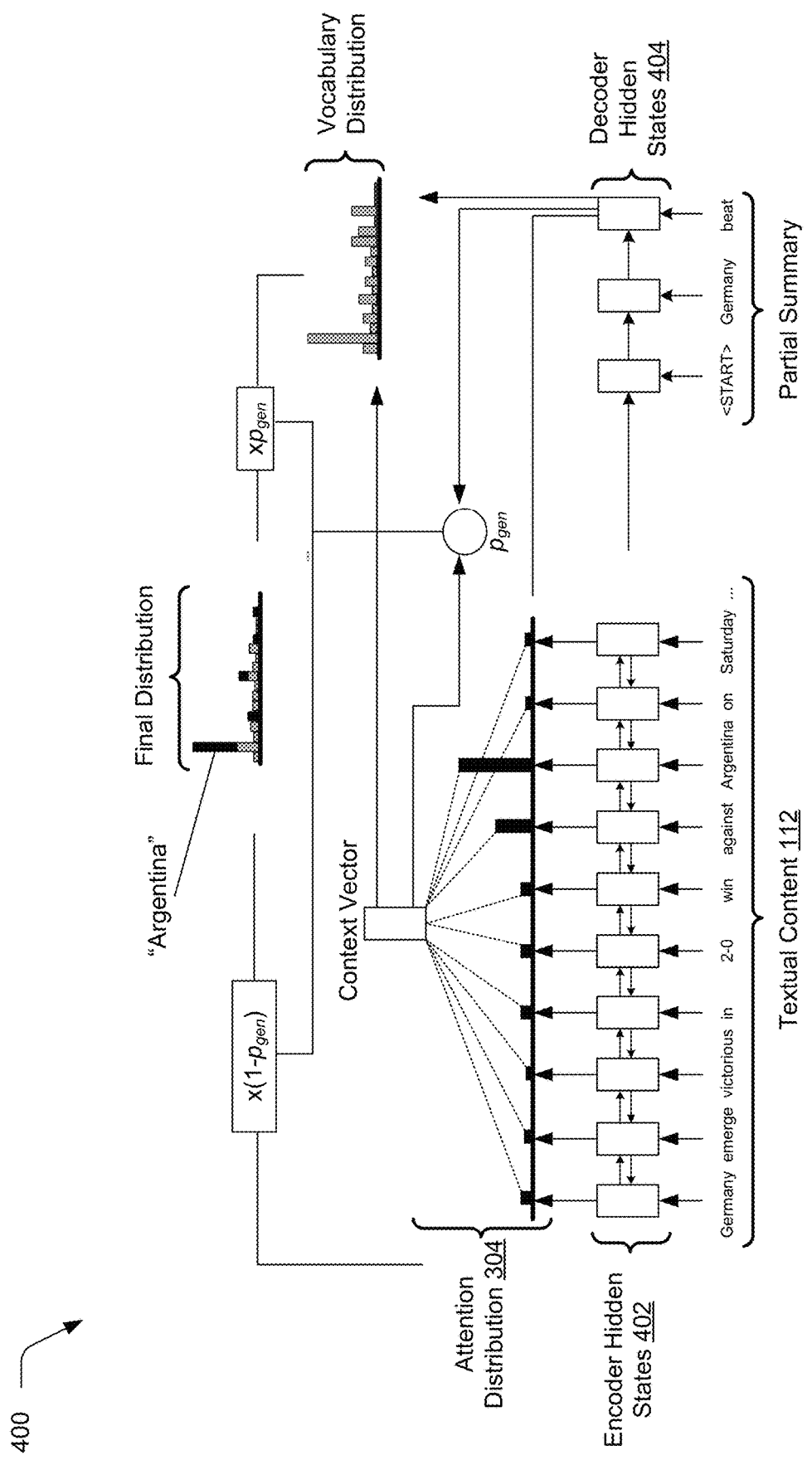
FIG. 4 illustrates an example of the word generation model of FIGS. 1 and 3 when configured as a neural encoder in accordance with one or more implementations.

FIG. 4 illustrates an example 400 of word generation model 120 of FIGS. 1 and 3 when configured as a neural encoder in accordance with one or more implementations.

In example 400, word generation model 120 is implemented as a neural encoder which can be implemented to map a sequence of words to another sequence of words. For example, by training on a large corpus of English sentences and their translations in French, the word generation model 120 can learn to output a French translation of an input sentence. This concept can be applied to configure the word generation model 120 to generate summaries of textual content. To ensure that the next generated word of the summary does not depend on only the previously generated word, the word generation model 120 may utilize a long-short term memory (LSTM) architecture. The LSTM architecture uses a gating mechanism which either retains information in memory, or discards previous information.

In example 400, the LSTM based encoder receives as input the word embedding vectors ("$w_i$") of the input textual content 112, and computes a sequence of encoder hidden states 402 ("$h_i$"). The final hidden state is passed to a decoder, which also computes a decoder hidden states 404 ("$s_t$") and generates a word embedding ("$y_t$") of a target word at each decoding time step.

While generating a word of the targeted summary 116, the word generation model 120 focuses more attention to certain parts of the input textual content 112 than others. For example, in example system 400, the word generation model 120 is generating a targeted summary 116 for the input textual content 112: "Germany emerges victorious in a 2-0 win against Argentina". The word generation model 120 can learn to generate the word "beat" by paying higher attention to the words "victorious" and "win". To do so, the word generation model 120 calculates an attention distribution 304 over all of the words in the textual content 112 using the following algorithm:

$$e_i^t = v^T \tanh(W_h h_i + W_s s_t + b_{att})$$

$$a^t = \operatorname{softmax}(e^t)$$

In the attention distribution algorithm above, v, $W_h$, $W_s$ and $b_{att}$ are trained using machine learning techniques over a corpus of textual content. The attention distribution 304, as discussed above, can be thought of as a probability distribution over words in the input textual content 112 which is learnt from the training corpus. The context vector $$h_t^* = \sum_i a_i^t h_i,$$

a weighted sum of the encoder hidden states 402, is used to determine the next word of the summary to be generated based on the words already generated within a defined "context" window.

To reproduce factual pieces of the input textual content 112, the word generation model 120 can be extended to include a probabilistic term to decide whether to generate words as before or to pick up from the input textual content 112 to copy factual details. At each stage of the decoder, the probability $p_{gen}$ is calculated which indicates whether to generate a word from the vocabulary, or copy from the source textual content 112 using the attention distribution 304. This probability can be calculated using the following algorithm:

$$P_{gen} = \sigma(w_h^T h_t^* + w_s^T s_t + w_y^T y_t + b_{gen}),$$

In the algorithm above, $w_h^T$, $w_s^T$, $w_y^T$ and $b_{gen}$, are trained based on a training corpus of text. The $p_{gen}$ can then be used to determine the attention distribution 304 over the words in the vocabulary given by the algorithm:

$$P(w) = p_{gen} P_{vocab(w)} + (1 - p_{gen}) \sum_{[i:w_i=w]} a_i^t$$

The second term allows the word generation model 120 to choose a word to copy from the input textual content 112 using the attention distribution 304. The P(w) yields the probability of the next word being generated, given the current word and the context.

Summary Generation Comparison and Results

FIG. 5 illustrates an example 500 of various summaries of an input article 502 which are generated using different summarization techniques.

A human-generated summary 504 of the input article 502 includes the text: "Bafetimbi Gomis collapses within 10 minutes of kickoff at Tottenham". A pointer generation model summary 506 of the input article 502 includes the text: "French striker Bafetimbi Gomis, who has a history of fainting, said he is now feeling well after collapsing during Swansea's 3-2 loss at Tottenham in the premier league on Wednesday". A summary with post processing 508 includes the text "French hitter Bafetimbi Gomis, who has a story of faint, tell he is now look good after . . . "

Notably, the summary with post processing 508, has replaced the text "history of fainting" from the input article 502, with "story of fainting" as it has determined that the word "story" is a simpler word, and hence is more preferred per the training data set. However, the second phrase of this summary does not make sense in this context. The pointer generation summary 506 has replaced the phrase "feeling well" with "looking good", which completely changes the meaning.

In contrast, the statistically replaced generation summary 510 and probabilistically re-weighted generation summary 512, of the described techniques, have generated summaries which do not include the contextual mistakes of these conventional techniques. Instead, the described statistically replaced generation summary 510 and probabilistically re-weighted generation summary 512 replace the phrase "feeling well" of the input article 502 with the term "fine", as fine is more preferred according to the training data corpus text of the target vocabulary. Notably, the term fine also makes sense in the context of the summary and the input article, and does not change the meaning of the input article 502.

Figure 6:
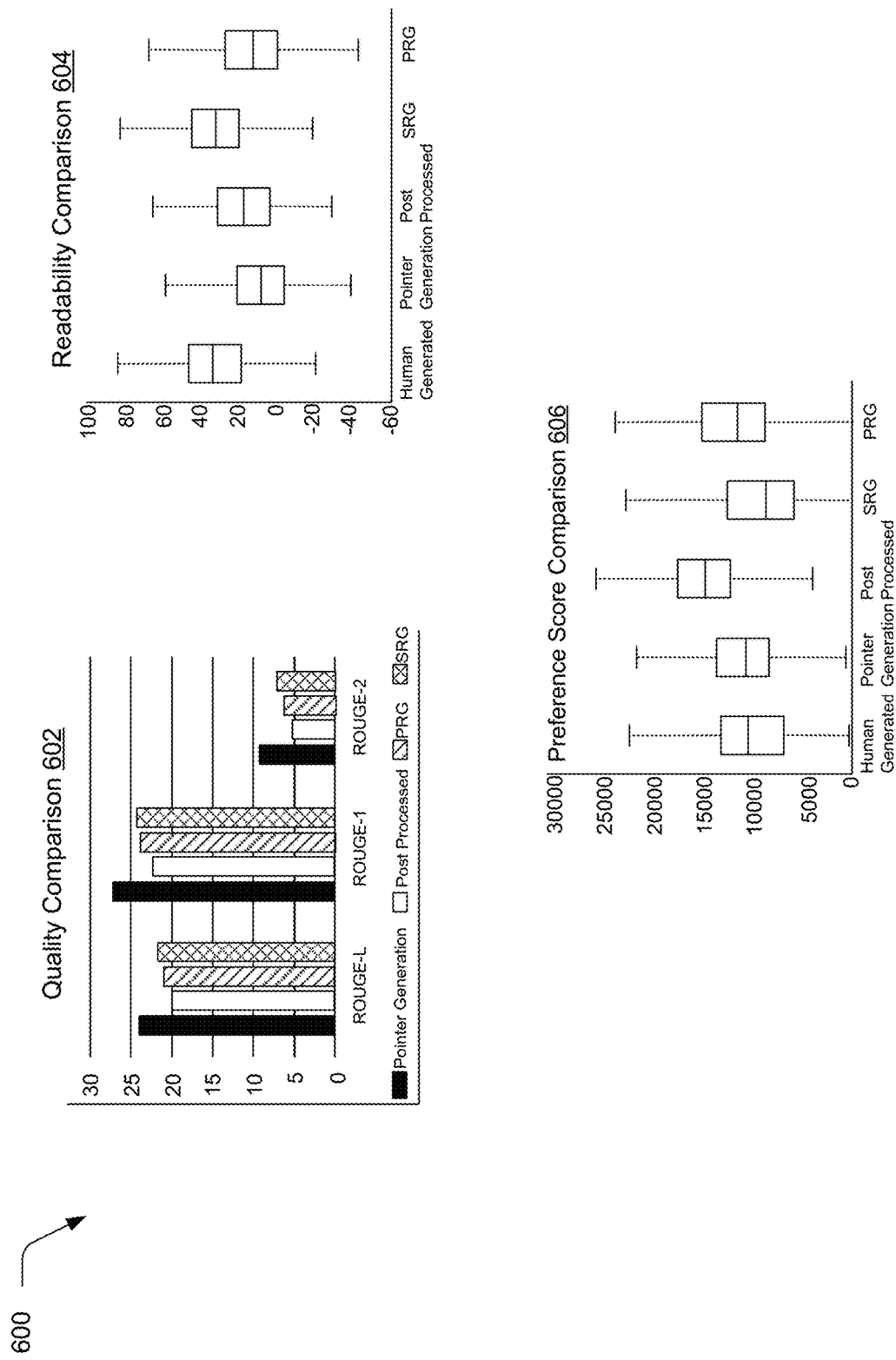
FIG. 6 illustrates results of metrics based evaluations of various summarization techniques.

FIG. 6 illustrates results 600 of metrics based evaluations of various summarization techniques. Results 600 compare summaries generated using pointer generation, post processing, and the described PRG and SRG techniques. The linguistic preference model 122, in this example, was trained using approximately 10,000 articles of a target audience vocabulary. Notably, the 10,000 articles used to train the linguistic preference model 122 were different than the training data used to train the word generation model 120.

Results 600 include a quality comparison 602, a readability comparison 604, and a preference score comparison 606. Quality comparison 602 is based on ROGUE scores which measure the precision, recall and f-measure for the occurrence of n-grams in the generated summary with respect to the reference human generated summary. In this example, the ROUGE-L variant was used which looks at the longest common subsequence between the reference summary and the machine generated summary.

Readability comparison 604 is based on Flesch reading ease, which quantifies the readability of the generated summary. The Flesch readability score uses the sentence length (number of words per sentence) and the number of syllables per word in an equation to calculate the reading ease. Texts with a very high Flesch reading ease score (about 100) are very easy to read. Higher scores indicate better readability and better coherence and hence makes better sense.

Preference Score comparison 606 uses the average preference score ($\Sigma_w P_{pref}(w_i|w)$) for the words in a generated summary to quantify the linguistic preference captured in summary.

As seen from comparisons 602, 604, and 606, all of the compared summarization techniques obtained comparable rouge scores indicating similar quality of the generated summary. The statistically replaced generated ("SRG") and probabilistically re-weighted generation ("PRG") techniques of the described techniques have produced summaries which have a higher preference scores than the baseline and human generated summaries since they are additionally tuned to the target vocabulary. Notably, the post processing techniques have generated similar preference scores as the described SRG and PRG techniques, however the post-processed summary yields a higher preference score at the cost of lower readability indicating a drop in the quality of the post-processed output. Human summaries have a lesser preference score, since they were generated without the knowledge of the target vocabulary.

Having discussed example details of the techniques for generated targeted summaries of textual content tuned to a target audience vocabulary, consider now some example procedures to illustrate additional aspects of the techniques.

Example Procedures

This section describes example procedures for generating a targeted summary of textual content tuned to a target audience vocabulary. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 7:
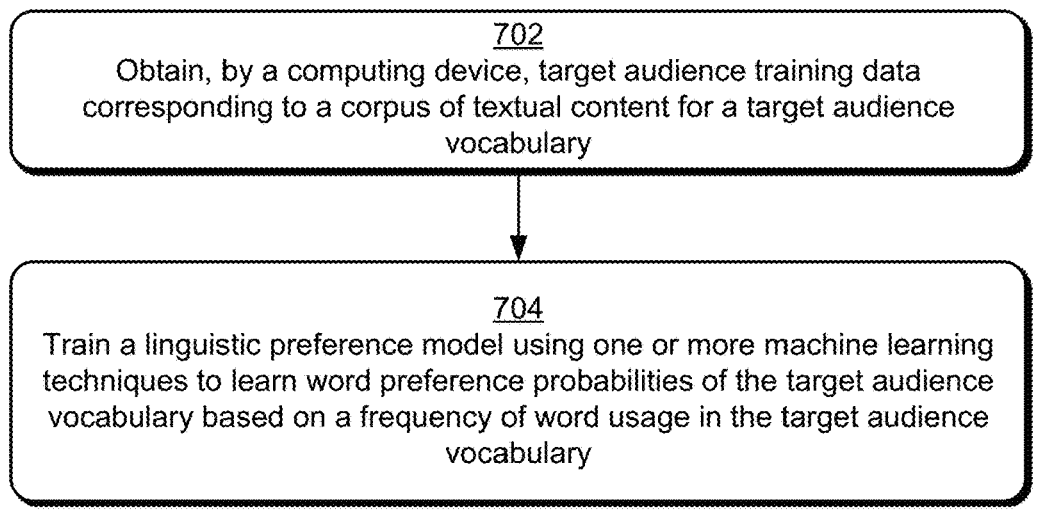
FIG. 7 depicts an example procedure of training a linguistic preference model using machine leaning and target audience training data.

FIG. 7 depicts an example procedure 700 of training a linguistic preference model using machine leaning and target audience training data.

Initially, target audience training data corresponding to a corpus of textual content for a target audience vocabulary is obtained (block 702). For example, linguistic preference training module 124 obtains target audience training data 126, corresponding to a corpus of textual content for a respective target audience vocabulary 114. The training data 126, for instance, may include a multitude (e.g., ten thousand) pieces of textual content (e.g., articles, papers, books) which are generated using the intended target audience vocabulary 114.

The linguistic preference model is trained using one or more machine learning techniques to learn word preference probabilities of the target audience vocabulary based on a frequency of word usage in the target audience vocabulary (block 704). For example, the training module 124 uses the training data 126 to learn word preference probabilities 202 for the linguistic preference model 122. The word preference probabilities 202 indicate relative preferences between words with similar meanings (e.g., synonyms) in the target audience vocabulary 114. In some cases, the determination of the word preference probabilities 202 is based on a frequency of word usage in the training data 126, such that a first word is preferred over a second word which is a synonym of the first word if the first word occurs more frequently in the training data 126.

In one or more implementations, in order to train the linguistic preference model 122, each candidate word 204 in the training data 126 is passed to a pairing module 206 employed by the linguistic preference training module 124. The pairing module 206 identifies all of the word senses 208 of the given candidate word 204 and all of the synonyms 210 of the various word senses 208 of the candidate word 204. Then, the pairing module 206 generates word sense-synonyms pairs 212 for each respective candidate word 204. The word sense-synonym pairs 212 are then passed to a frequency module 214, of the training module 124. The frequency module 214 determines a word sense frequency 216 and a synonym frequency 218 for each word sense 208 and synonym 210, respectively, of the word sense-synonym pair 212. The frequencies 216 and 218 correspond to the number of occurrences of each word in the training data 126. Next, a word preference probability module 220, of the training module 124, obtains the word sense frequency 216 and synonym frequency 218 for each respective word sense-synonym pair 212, and generates the word preference probability 202 for the respective word sense-synonym pair 212.

Figure 8:
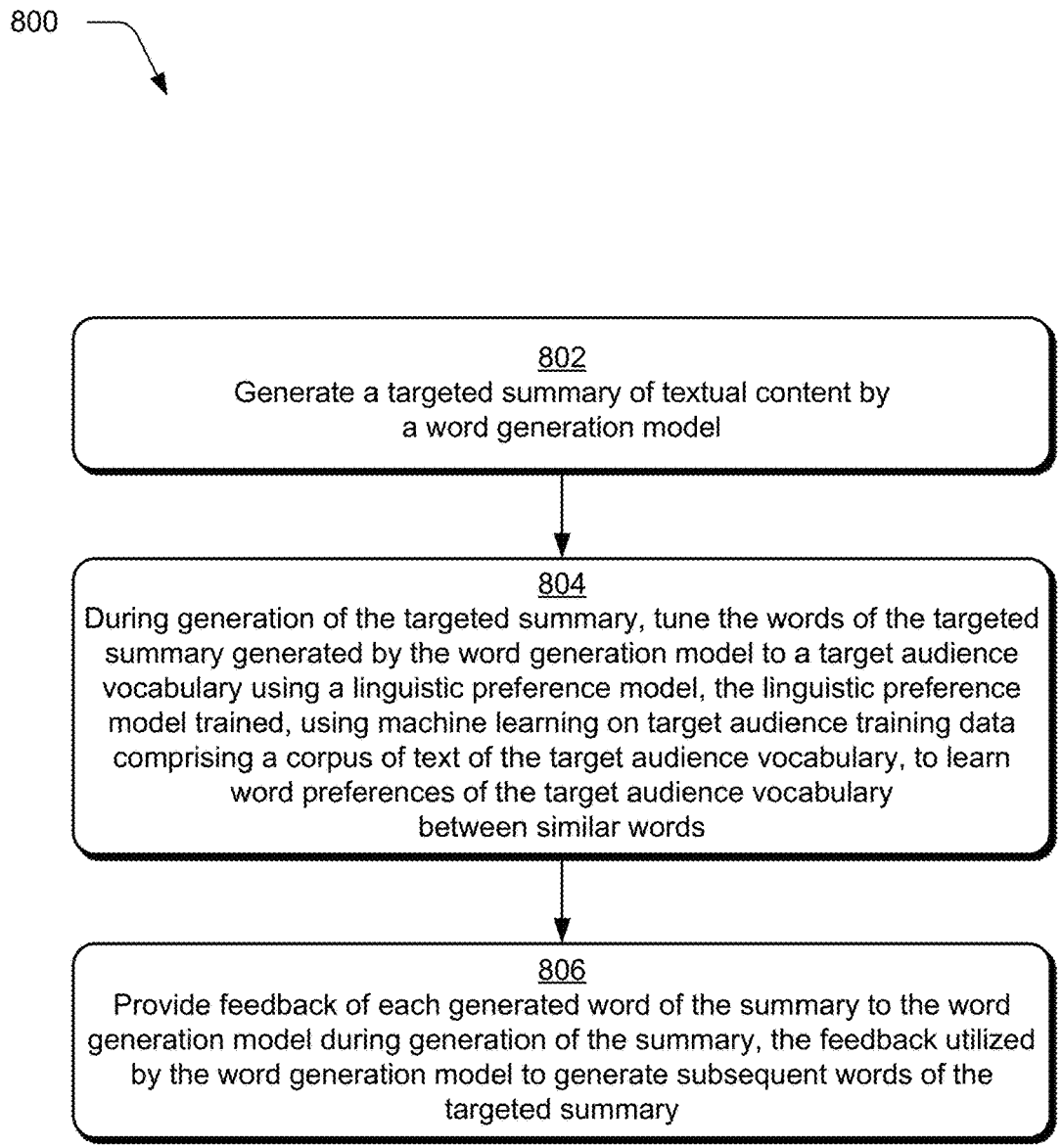
FIG. 8 depicts an example procedure of generating a targeted summary of textual content tuned to a target audience vocabulary.

FIG. 8 depicts an example procedure 800 of generating a targeted summary of textual content using a word generation model and a linguistic preference model.

A targeted summary of textual content is generated by a word generation model (block 802). By way of example, a targeted summary 116 of textual content 112 is generated by a word generation model 120.

During generation of the targeted summary, the words of the targeted summary generated by the word generation model are tuned to a target audience vocabulary using a linguistic preference model, where the linguistic preference model is trained, using machine learning on target audience training data comprising a corpus of text of the target audience vocabulary, to learn word preferences of the target audience vocabulary between similar words (block 804). By way of example, during generation of the targeted summary 116, the words of the targeted summary generated by the word generation model 120 are tuned to a target audience vocabulary 114 using a linguistic preference model 122. The linguistic preference model 122 is trained, using machine learning on target audience training data 126, to learn word preferences of the target audience vocabulary between similar words (e.g., synonyms).

Feedback of each generated word of the summary is provided to the word generation model during generation of the summary, where the feedback utilized by the word generation model to generate subsequent words of the targeted summary (block 806). By way of example, a feedback module 318 provides generated word feedback 320 to the word generation model 120 during generation of the targeted summary 116. The feedback 320 is then utilized by the word generation model 120 to generate subsequent words of the targeted summary 116.

FIG. 9 depicts an additional example procedure 900 of generating a targeted summary of textual content tuned to a target audience vocabulary.

A request is received to generate a targeted summary of textual content tuned to a target audience vocabulary (block 902). By way of example, a targeted summary module 118 receives request 110 to generate a targeted summary of textual content 112 tuned to a target audience vocabulary 114.

An attention distribution is generated by a word generation model which includes words from the textual content and the target audience vocabulary and selection probability values for each word in the attention distribution, where the selection probability values indicate a respective probability for each word of being selected as the next word for the targeted summary of the textual content (block 904). By way of example, the word generation model 120 generates attention distribution 304 of words 306 in the textual content 112 and the target audience vocabulary 114 along with selection probability values 308 for each word. The selection probability values 308 indicates a respective probability for each word of being selected as a next generated word for the targeted summary 116. An attentional decoder 302 of the word generation model 120 can determine the selection probability values 308 based on the words in the inputted textual content 112 as well the words of the targeted summary 116 which have already been generated by the word generation model 120.

The next word for the targeted summary is selected based on the attention distribution and a linguistic preference model indicating word preference probabilities for the target audience vocabulary (block 906). For example, a selection module 310 selects a next generated word 312 for the targeted summary 116 based on the attention distribution 304, generated by the attentional decoder 302 of the word generation model 120, and the linguistic preference model 122 trained on training data 126 corresponding to the target audience vocabulary 114.

In some cases, to encourage generation of the most preferred words of the target audience vocabulary 114, the selection module 310 can modify the selection probability values 308 of the attention distribution 304 with the word preference probabilities 202 of the target audience learned by the linguistic preference model 122. Thus, the selection module 310 selects the next generated word 312 by either selecting a word from the input textual content 112 based on the attention distribution 304, or by replacing a word from the input textual content 112 with a most preferred synonym of the target audience, as indicated by the word preference probabilities 202 of the linguistic preference model 122. The selection module 310 may select the next generated word 312 of the targeted summary 116 using a variety of different word generation techniques, such as statistically replaced generation 314 or probabilistically re-weighted generation 316.

Feedback of the selected next word is provided to the word generation model, the feedback causes the word generation model to modify the attention distribution for selection of subsequent words of the targeted summary based on the feedback of the next selected word (block 908). By way of example, after the next generated word 312 is selected by the selection module 310, the generated word is added to the targeted summary 116. In addition, a feedback module 318 provides generated word feedback 320 to the attentional decoder 302, which is usable by the attentional decoder 302 of the word generation model 120 to select the subsequent words for the targeted summary 116.

Having described example procedures in accordance with one or more implementations, consider now an example system and device that can be utilized to implement the various techniques described herein.

Example System and Device

Figure 10:
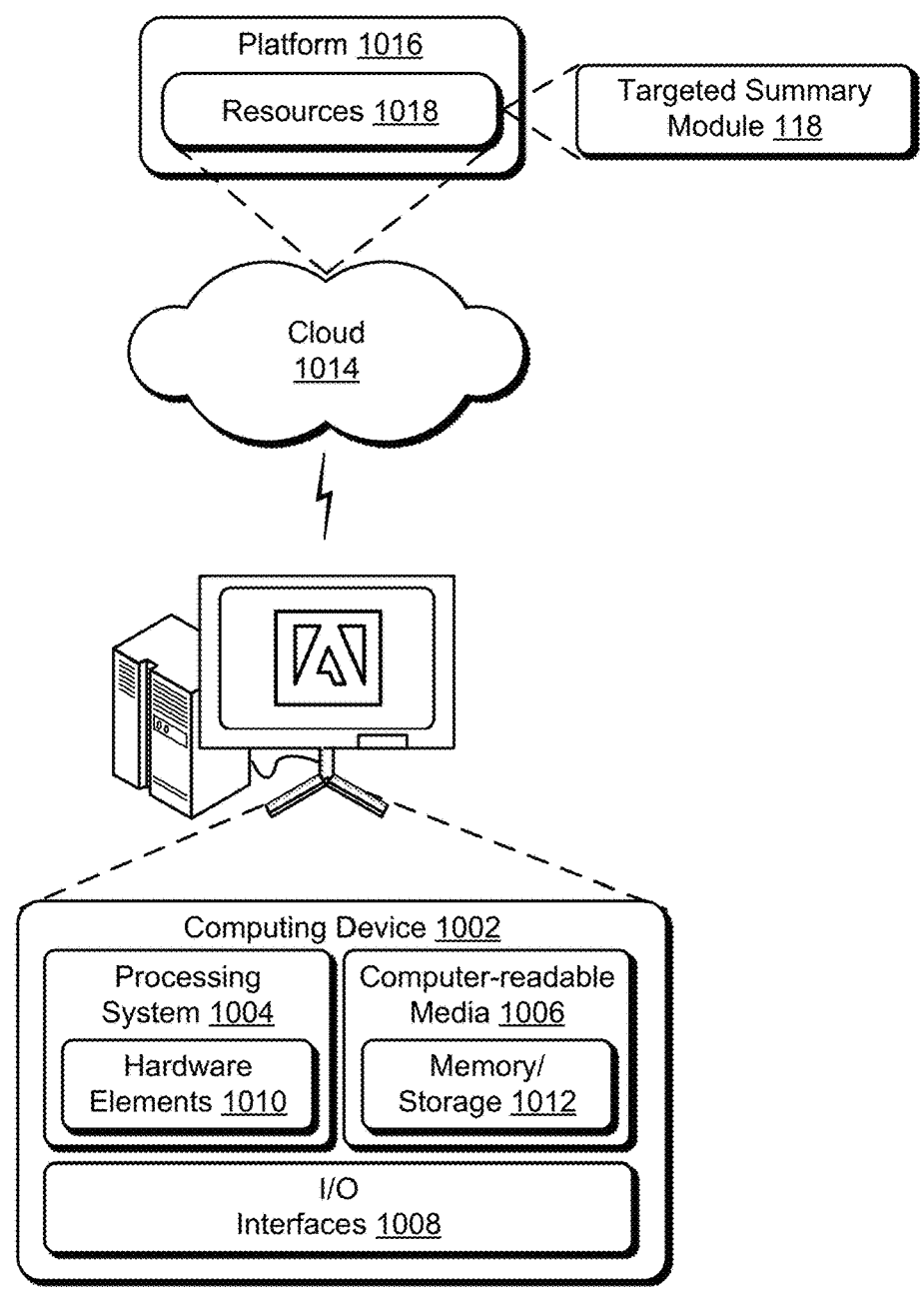
FIG. 10 illustrates an example system that includes an example computing device that is representative of one or more computing systems and/or devices that may implement the various techniques described herein.

FIG. 10 illustrates an example system generally at 1000 that includes an example computing device 1002 that is representative of one or more computing systems and/or devices that may implement the various techniques described herein. This is illustrated through inclusion of the targeted summary module 118. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support reader interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a targeted summary of textual content tuned to a target audience vocabulary, a method implemented by at least one computing device, the method comprising:
   receiving, by the at least one computing device, a request to generate the targeted summary of textual content tuned to the target audience vocabulary;
   generating, by a word generation model, an attention distribution comprising words from the textual content and the target audience vocabulary and selection probability values for each word in the attention distribution;
   boosting the selection probability values of the attention distribution for words that are preferred by the target audience vocabulary using a linguistic preference model that indicates word preference probabilities of the target audience vocabulary;
   selecting the next word for the targeted summary based on the boosted selection probability values of the attention distribution; and
   providing feedback of the selected next word to the word generation model, the feedback causing the word generation model to modify the attention distribution for selection of subsequent words of the targeted summary based on the feedback of the next generated word.

2. The method as described in claim 1, wherein the feedback is provided to the word generation model during generation of the summary.

3. The method as described in claim 1, wherein the selection probability values indicate a respective probability for each word of being selected as the next word for the targeted summary of the textual content.

4. The method as described in claim 1, wherein selecting the next word for the targeted summary further comprises:
   selecting at least one word generated by the word generation model based on the attention distribution; and
   replacing the selected at least one word with a more preferred synonym of the target audience vocabulary identified by the linguistic preference model.

5. The method as described in claim 1, wherein selecting the next word for the targeted summary further comprises replacing words in the attention distribution with more preferred synonyms identified by the linguistic preference model.

6. The method as described in claim 1, wherein the linguistic preference model is trained using one or more machine learning techniques to learn the word preference probabilities of the target audience vocabulary based on a frequency of word usage in target audience training data.

7. The method as described in claim 6, wherein the target audience training data comprises a corpus of the target audience vocabulary.

8. The method as described in claim 6, wherein the word generation model can be utilized to generate targeted summaries tuned to multiple different target audience vocabularies by using different respective linguistic preference models corresponding to the respective target audience vocabulary without re-training the word generation model.

9. The method as described in claim 1, wherein the word generation model comprises an extractive summarization algorithm trained using one or more machine learning techniques.

10. The method as described in claim 1, wherein the word generation model comprises an abstractive summarization algorithm trained using one or more machine learning techniques.

11. In a digital medium environment to train a linguistic preference model using target audience training data, a method implemented by at least one computing device, the method comprising:
   obtaining, by the at least one computing device, target audience training data comprising a corpus of textual content for a target audience vocabulary; and
   training the linguistic preference model using one or more machine learning techniques to learn word preference probabilities of the target audience vocabulary based on a frequency of word usage in the target audience vocabulary.

12. The method as described in claim 11, wherein training the linguistic preference model using one or more machine learning techniques to learn word preference probabilities of the target audience vocabulary further comprises:
   identifying a word in the target audience training data;
   identifying one or more synonyms of the word; and
   for each word-synonym pair, generating the word preference probability, for a respective word-synonym pair, based on a respective frequencies of the word and the synonym in the target audience vocabulary.

13. The method as described in claim 12, wherein the word preference probability for the word-synonym pair indicates that the synonym is preferred over the word if the frequency of the synonym is greater than the frequency of the word in the target audience training data.

14. The method as described in claim 12, wherein the word preference probabilities are generated for multiple word senses of the word.

15. The method as described in claim 11, further comprising utilizing the determined word preference probabilities of the linguistic preference model to tune a summary of textual content generated by a word generation model to the given target audience vocabulary of the linguistic preference model.

16. A system implemented in a digital medium environment to generate a targeted summary of textual content tuned to a target audience vocabulary, the system comprising:
    at least one processor;
    memory having stored thereon computer-readable instructions that are executable by the processor to implement a targeted summary module to perform operations comprising:
        generating, by a word generation model, a targeted summary of textual content; and
        during generation of the summary, tuning the words of the targeted summary generated by the word generation model to a target audience vocabulary using a linguistic preference model, the linguistic preference model trained, using machine learning on target audience training data comprising a corpus of text of the target audience vocabulary, to learn word preferences of the target audience vocabulary between similar words.

17. The system described in claim 16, wherein the operations further comprise providing feedback of each generated word of the summary to the word generation model during generation of the summary, the feedback utilized by the word generation model to select generate subsequent words of the targeted summary.

18. The system described in claim 16, wherein the tuning the words of the targeted summary comprises replacing one or more words of textual content with a more preferred synonym identified by the linguistic preference model.

19. The system as described in claim 16, wherein the linguistic preference model includes word preference probabilities indicating relative preferences between a given word and similar words based on a frequency of usage of the given word and the similar word in the target audience training data.

20. The system as described in claim 16, wherein the word generation model can be utilized to generate targeted summaries tuned to multiple different target audience vocabularies by using different respective linguistic preference models corresponding to the respective target audience vocabulary without re-training the word generation model.

* * * * *